United States Patent [19]

Stanley et al.

[11] 4,061,618

[45] Dec. 6, 1977

[54] PROCESS FOR PREPARING STABLE POLYURETHANE LATICES

[75] Inventors: Henry Stanley, Cedar Grove; Dilip K. Ray-Chaudhuri, Somerville, both of N.J.

[73] Assignee: National Starch and Chemical Corporation, Bridgewater, N.J.

[21] Appl. No.: 575,253

[22] Filed: May 7, 1975

[51] Int. Cl.$^2$ ............................................. C08L 75/08
[52] U.S. Cl. .................... 260/29.2 TN; 260/29.2 EP; 260/29.3; 260/29.4 R; 260/29.6 NR
[58] Field of Search ............... 260/29.2 TN, 77.5 AM, 260/77.5 AA, 77.5 AN

[56] References Cited

U.S. PATENT DOCUMENTS

| | | | |
|---|---|---|---|
| 2,968,575 | 1/1961 | Mallonee | 260/29.2 TN |
| 3,044,898 | 7/1962 | Habib | 260/29.2 TN |
| 3,061,470 | 10/1962 | Kuemmerer | 260/29.2 TN |
| 3,188,302 | 6/1965 | Lorenz et al. | 260/77.5 |
| 3,242,230 | 3/1966 | Habib | 260/29.2 TN |
| 3,410,817 | 11/1968 | McClellan | 260/29.2 |
| 3,437,624 | 4/1969 | Dawn et al. | 260/29.2 TN |
| 3,539,482 | 11/1970 | Stewart | 260/29.2 |
| 3,660,010 | 5/1972 | Georgoudis et al. | 260/29.2 TN |

*Primary Examiner*—Theodore E. Pertilla
*Attorney, Agent, or Firm*—Edwin Szala; Ellen T. Dec

[57] ABSTRACT

Stable polyurethane polymer latices are obtained by incorporating specified amounts of polyethylene glycol into the backbone of various polyurethane polymers. The polyurethane latices are non-ionic but can assume an anionic or cationic character by the addition of anionic or cationic emulsifying or surface active agents. The latices have wide utility, for example, as adhesives, coatings, textile sizes, binders, and in molding applications.

9 Claims, No Drawings

PROCESS FOR PREPARING STABLE POLYURETHANE LATICES

BACKGROUND OF THE INVENTION

This invention relates to polymer latices which have wide utility as adhesives, coatings, textile sizes, packaging films, and the like. The polymers are also useful as binders in the textile, leather and paper industries, and as intermediates or ingredients in the production of synthetic resin systems for coating, molding and casting applications. In more detail, this invention relates to polyurethane polymer latices which are prepared by the incorporation of polyethylene glycol, within defined limits, into the backbone of a polyurethane polymer.

The use of polyethylene glycol(s) as a polyol constituent in the preparation of polyurethane polymers, usually in conjunction with other polyalkylene glycols or polyesters, has been known for some time. However, because of their hydrophilicity, polyethylene glycols are not a favore ingredient of polyurethanes since their presence tends to impart water sensitivity to the polyurethane polymer. Indeed, when a substantial proportion of a polyethylene glycol is used in a polyurethane, the resultant polyurethane may be water soluble. If a water soluble or water dilutable polyurethane incorporating polyethylene glycol is desired, all or a substantial portion of the polyol component of the polymer would necessarily be polyethylene glycol. Alternatively, polyethylene glycols are generally avoided in preparing water insoluble polyethylene glycols are generally avoided in preparing water insoluble polyurethanes since even small amounts would impart a significant degree of water sensitivity to the polymer. Whatever advantageous properties polyethylene glycols may serve to contribute to the polymer can be obtained ordinarily with the use of hydrophobic polyalkylene glycols which would not affect the water sensitivity of the polymer. In view of the known effects of incorporating polyethylene glycol in polyurethane polymers, it is surprising that its use in specified and critical amounts imparts emulsifiability to an otherwise water insoluble polymer.

It is the object of this invention to provide useful polyurethane polymer latices of non-ionic character which can be used as adhesives, coatings, binders, saturants, and the like.

It is another object of this invention to provide useful polyurethane polymer latices which possess an anionic or cationic character and which can be used as adhesives, coatings, binders, saturants, and the like.

A further object is to provide a process for the production of these non-ionic or cationic polyurethane latices.

Another further object is to provide polyurethane polymers in an aqueous medium, free from toxic and photochemically active organic solvents.

Other objects of this invention will be apparent to those skilled in the art to which this invention pertains.

BRIEF SUMMARY OF THE INVENTION

We have found that the incorporation of polyethylene glycol within defined proportions as a polyol constituent of a polyurethane polymer in conjunction with the use of controlled processing techniques enables the production of stable polyurethane polymer latices. The resultant polyurethane latices are non-ionic in character and it is a feature of this invention that the non-ionic latices thus produced may, if desired, assume either or anionic or cationic character by the addition thereto of commonly used anionic or cationic emulsifying agents.

The polyurethane latices prepared in accordance with the present invention comprise polyurethane polymers having incorporated therein from 2 to 12%, by weight, of a polyethylene glycol having a molecular weight of from 600 to 20,000. This polyethylene glycol component is combined with organic compounds having at least two reactive hydrogen atoms and a molecular weight of from about 300 to about 20,000, preferably from 500 to 5,000, in a chemical reaction with an organic polyisocyanate. The resultant polyurethane polymers will have molecular weights ranging from about 5,000 to about 1,000,000 and will be readily emulsifiable due to the specific degree of hydrophilicity introduced by the polyethylene glycol contained in the polymer backbone.

As a further aspect of the present invention, a prepolymer having free isocyanate groups which results from the reaction of the organic composed having at least two reactive hydrogen atoms and the organic polyisocyanate may, if desired, be chain extended with an additional compound containing at least two reactive hydrogen atoms which has a molecular weight of less than about 500, preferably less than 300. Optionally, such compound, so-called "chain extending agent" may be utilized in the initial reaction with the organic polyisocyanate.

The introduction of the polyethylene glycol may be accomplished either at the same time or preceding or subsequent to the reaction of the polyisocyanate with these chain-extending compounds.

The actual polymerization process may be carried out in any organic solvent commonly used in polyurethane polymerizations or without the presence of any solvent. When a desired viscosity is reached, polymerization is terminated and a suitable amount of water is added to the reaction mixture. The reaction mixture is self-emulsifying and addition of the water with agitation provides the polyurethane latex. Any solvent present may be removed, if desired, by heating either at atmospheric or reduced pressure.

DETAILED DESCRIPTION OF THE INVENTION

In accordance with this invention, any organic compound having at least two reactive hydrogen atoms (as determined by the Zerewitinoff method), said hydrogen atoms being reactive with an isocyanate group, may be used for the preparation of the polyurethane polymer latices of this invention. The reactive hydrogen atoms are usually attached to oxygen, nitrogen or sulfur atoms. These compounds will have a molecular weight of from about 300 to about 20,000, preferably from about 500 to 5,000. Preferably, these compounds will be linear, but use of small amounts of non-linear compounds is permissible providing such use does not cause gelling during polymerization.

The organic compounds employed are preferably those having hydroxy, carboxyl, amino or mercapto groups, with the most preferred being polyhydroxyl compounds such as polyester diols, polyacetal diols, polyamide diols, polyester polyamide diols, poly(alkylene ether) diols, polythioether diols, and the like. Compounds which contain two or more different groups within these classes may also be used herein. Such compounds include, for example, amino alcohols and amino alcohols which contain two amino groups and one hydroxyl group and the like. It is preferred to use difunctional compounds although small amounts of tri- (and greater) functional compounds may be used.

Suitable polyether diols are, for example, the condensation products of ethylene oxide, propylene oxide, butylene oxide, tetrahydrofuran and the copolymerization, graft or block polymerization products thereof such, for example, as mixed ethylene oxide, propylene oxide condensates as well as products prepared by reacting olefins under high radiation with the alkylene oxide condensates to prepare graft polymerization products. Polyethers are suitable which are prepared by condensation of the aforementioned alkylene oxides and polyhydric alcohols such as ethylene glycol, 1,2-propylene glycol and 1,4-butanediol.

Suitable polyester diols which are preferably saturated include polyester amides and polyamides obtained, for example, from saturated or unsaturated polycarboxylic acids and saturated and unsaturated polyhydric alcohols, diamines, polyamines and the like. Suitable carboxylic acids for preparing these polyesters include, for example, adipic acid, succinic acid, phthalic acid, tetephthalic acid, maleic acid and the like. Polyhydric alcohols useful in preparing the polyesters include, for example, ethylene glycol, 1,2-propylene glycol, 1,4-butanediol, neopentyl glycol, hexanediol, trimethylolpropane and the like. Aminoalcohols, for example, ethanol amine are also useful. Suitable diamines include diamines such as ethylene diamine, hexamethylene diamine and the like.

Suitable polyacetals, for example, can be prepared from 1,4-butanediol or hexanediol and formaldehyde. The polythioethers are, for example, condensation products of thiodiglycol either alone or in combination with other glycols such as ethylene glycol, 1,2-propylene glycol or with other polyhydroxy compounds disclosed above.

Polyhydroxyl compounds which already contain urea or urethane groups as well as natural polyols which may be further modified if desired, for example, castor oil, carbohydrates and the like may also be used.

The polyethylene glycols useful in this invention are preferably those which are available commercially and produced by the reaction of ethylene oxide with water, ethylene glycol, or diethylene glycol in the presence of sodium hydroxide as a catalyst. These polyethylene glycols are characterized by the structure: $H(OCH_2CH_2)_xOH$ wherein $x$ is equal to about 13 to about 450, and preferably equal to from about 90 to about 136. These polyethylene glycols have molecular weights of from about 600 to about 20,000 and preferably from 4,000 to 6,000. A polyethylene glycol which is homogeneous in molecular weight, or a mixture of polyethylene glycols which differ in molecular weight can be used. Those skilled in the art will readily see that small amounts of additional alkylene oxides may be copolymerized into the polyethylene glycol provided that the hydrophilic nature of the glycol is not destroyed.

Among the suitable organic polyisocyanates (or mixtures) that may be used in this invention are included both aliphatic and aromatic polyisocyanates and, preferably, diisocyanates such as, for example, 1,5-naphthylene diisocyanate; 4,4-diphenylmethane diisocyanate; 4,4'-diphenyldimethane diisocyanate; di- and tetraalkyldiphenylmethane diisocyanates such as 2,2'-dimethyl-4,4'-diphenylmethane and the like; 4,4'-dibenzyldiisocyanate; 1,3-phenylene diisocyanate; 1,4-phenylene diisocyanate; 2,4-tolylene diisocyanate; 2,6-tolylene diisocyanate; mixtures of 2,4- and 2,6-tolylene diisocyanate; 2,6-dichloro-1,4-para-xylene diisocyanate; 2,2'-dichloro-4,4'-diisocyanato diphenylmethane; 2,4-dibromo-1,5-diisocyanato naphthalene; phosphorus containing isocyanates such as phenyl di-(4-isocyanato phenyl)-phosphate; butane-1,4-diisocyanate; hexane-1,6-diisocyanate; cyclohexane-1,4-diisocyante; dicyclohexyl methane-4,4'-diisocyanate, and the like.

Masked isocyanates are also useful, and yield polyurethane polymers from polymerizations carried out at higher temperatures where the free isocyanate groups are released for reaction. Representative polyisocyanates which may be used for this purpose are, for example, dimeric-2,4-tolylene diisocyanate as well as polyisocyanates which have had their isocyanate groups blocked with, for example, phenol, tert. butanol, phthalimide, caprolactam, and the like. Generally, the preferred masked polyisocyanates useful herein are the diisocyanates. However, small amounts of triisocyanates and those of higher functionality can be used provided their use does not cause gelling of the polymerization mixture.

In preparing the polyurethane polymer, as already mentioned, in addition to the high molecular weight organic compound having at least two reactive hydrogen atoms, it is often desirable to use as a chain extender an organic compound of this type having a molecular weight less than about 500, preferably less than about 300 and more than 60. Typical chain extending agents include saturated or unsaturated glycols such as ethylene glycol or condensates thereof such as diethylene glycol, triethylene glycol and the like. Also useful are amino alcohols such as ethanolamine, propanolamine, butanolamine, and the like, as well as mono- and dialkoxylated aliphatic, cycloaliphatic, aromatic and heterocyclic primary amines such as N-methyldiethanolamine; N,N-bis-gamma-aminopropyl-N-methylamine; N-oleyl diethanolamine; N-cyclohexyl diisopropanolamine; N,N-dihydroxyethyl-p-toluidine; N,N-dihydroxypropylnaphthylamine and the like. Carboxylic acids may also serve as chain extending agents, for example, aliphatic, cycloaliphatic, aromatic and heterocyclic dicarboxylic acids. Specific examples of such acids include oxalic acid, malonic acid, succinic acid, glutaric acid, adipic acid, sebacic acid, terephthalic acid, 1,5-dicarboxylic naphthalic acid, maleic acid, fumaric acid, diglycolic acid, quinolinic acid, lutidinic acid and the like. Useful amino carboxylic acids include, for example, glycine, alpha and beta-alanine, 6-aminocaproic acid, 4-aminobutyric acid, p-aminobenzoic acid, 5-aminonaphthoic acid and the like. Aliphatic diols are the preferred chain extending agents.

This process may be carried out with or without the use of typical urethane reaction catalysts such as are known to those in the art. These catalysts include dibutyl tin dilaurate and also stannous salts of carboxylic acids having from 2 to 18 carbon atoms, such as, for example, stannous laurate, stannous stearate, stannous acetate, stannous butyrate, stannous octoate and the like, and mixtures thereof. Other compounds which are suitable include dibutyl tin dimaleate, tributyl tin oxide, dibutyl tin sulfide, lead resinate, lead benzoate, lead salicylate, lead 2-ethyl hexoate, lead oleate, iron acetyl acetonate, cobalt benzoate, tetra (2-ethyl hexyl) titanate, tetra butyl titanate, and the like. Many other compounds accelerate the reaction of a hydroxyl or other groups with an isocyanate in preference to certain other reactions of the isocyanate group. Any of these compounds may be used. Those skilled in the art will use those compounds and mixture of compounds, as catalysts, to confer those specific structural properties to individual urethane reactions that they specifically desire. The foregoing list of specific compounds are only the preferred compounds and are given for the purpose of illustration and not limitation. Any suitable tertiary amine can be used along with the metallic catalyst, such as for example, triethylene diamine, N-ethyl morpholine, N-methyl morpholine, 4-dimethyl amino ethyl piperazine, and the like if desired.

With respect to proportions, the ingredients should be taken so that the molecular ratio of isocyanate groups to reactive hydrogen atoms (including those from the polyethylene glycol and from the chain extending agent) preferably lies between about 0.7:1 and 1.3:1, and most preferably between about 0.9:1 and 1.2:1. The polyethylene glycol will be present in proportions of from 2 to 12%, preferably from 4 to 8%, by weight of total polymer solids.

In carrying out the polymerization, a preadduct may be prepared from the higher molecular weight organic compound having reactive hydrogen atoms, the polyethylene glycol and the polyisocyanate by heating the ingredients, with or without solvent, at temperatures initially preferably at from about 50° to about 150° C. and thereafter may be further reacted at from about 20° to about 150° C., preferably in solution with one or more of the described chain extending agents. The reaction periods will be variable depending on such factors as the reactivity of the ingredients and the temperatures employed. In most instance, however, reaction periods of from about 2 to 6 hours will be sufficient.

When the polymerization mixture reaches a desired viscosity (from about 20,000 to 140,000 cps), polymerization is terminated and water is added to the mixture with agitation thereby providing the polyurethane latex. The resultant polymers will possess an intrinsic viscosity (I.V.) of from 0.2 to 2.0, preferably 0.6 to 1.0. Measurements of I.V. (expressed in deciliters/grams) are made using a Cannon-Fenske capillary viscometer (size 100) as described by P. J. Flory in "Principles of Polymer Chemistry," VII, (1953) p. 309–310. The amount of water employed with be such as to bring the latex solids of the mixture to within a range of from 20 to 60%, by weight. Subsequent to the production of the latex, the solvent used in the polymerization may be removed, if desired, by distillation either at ambient or reduced pressures.

In a variation of the above polymerization, the reaction is carried out in a single step in which the chain extending agent is included with the other ingredients of the initial reaction mixture. The most preferred manner of carrying out this invention is to utilize polyether and polyester ingredients which contain free primary or secondary hydroxyl groups and which are difunctional. A chain extending agent providing short chain segments as desired from a glycol containing primary or secondary hydroxyl groups is also utilized. Also included in the initial reaction mixture is the described polyethylene glycol (within the specified limits) and an organic solvent, for example, acetone or tetrahydrofuran. The polyisocyanate is added to the reaction vessel, gentle heating is applied, and the polymerization is allowed to take place at a temperature of about 60° to 70° C. until a desired viscosity is reached (from about 20,000 to 140,000 cps). Ordinarily, reaction periods will range from about 2 to 6 hours. At this point, water is added to the reaction mixture, which is self-emulsifying with agitation, thereby providing the latex of this invention. The organic solvent may then be stripped off, if desired, by heating at atmospheric or reduced pressure.

The aqueous or aqueous-organic polyurethane latices (dispersions) produced in accordance with the present invention are stable for up to six months or more without the addition of emulsifying agents, but non-ionic, anionic or cationic emulsifiers or surface active agents may be employed if desired. Typical emulsifying agents useful herein include poly(alkylene ether) glycols of long chain alcohols, alkyl sulfonic acids, fatty acid soaps, tall oil, alkyl aryl sulfonic acids, alkali metal salts of high molecular weight fatty acids, quaternary ammonium salts, hydroxyethylated alkyl phenols, hydroxy ethyl cellulose, polyvinyl alcohol, and other such materials known in the art. Although this invention teaches that the use of emulsifiers, surface active agents, dispersants, or protective colloids are not essential, in certain embodiments, however, practitioners may wish to employ such materials for purposes of affecting certain properties such as particle size, viscosity, wetting rheology, and the like. Thus, those amounts of emulsifiers, surface active agents, dispersants, and protective colloids may be used which satisfactory achieve these purposes. It will be found, however, that the amount of these materials required to effect a broad range of properties generally will not exceed 5%, by weight, of the polymer solids. In some instances, amounts up to about 8 or 9% or more, by weight, may be necessary, and the mentioned amounts are not to be considered to represent any limitations thereof.

The point at which these materials are actually incorporated into the polyurethane is not critical. However, as can be recognized by the practitioner, those emulsifiers, surface active agents, dispersants, and protective colloids which contain active hydrogen atom, must be added after the polyurethane forming reaction is completed. Generally, the addition of these materials is preferable just prior to the addition of water.

In some instances it may be desirable that the polyurethane polymer itself possess some anionic or cationic properties, and in these instances suitable anionic or cationic monomers or coreactants are utilized directly in the preparation of such polymers. In other instances, it may be desirable or preferable to have the latex possess anionic or cationic properties. In these instances the incorporation of anionic or cationic agents, for example, emulsifiers, dispersants and the like, will produce the desired effect.

The latices of this invention may be blended or mixed with dispersions or solutions of other polymeric materials, e.g. dispersions or solutions of polyvinyl chloride, polyethylene, polystyrene, polybutadiene and copolymer resins thereof, aqueous solutions of resin forming condensation products which contain sulfonic acid or sulfonate groups such as phenolformaldehyde/alcohol modified aminoplasts and condensates which contain as components formaldehyde, phenol, melamine, urea, and ethylene urea, and compounds having a triazine ring, as well as water soluble or water dispersible polyepoxides, and the like.

The products of the process may be subjected to a forming process in the presence of known crosslinking agents. For this purpose, polyfunctional crosslinking agents may be added to the polyurethane polymers in the course of their polymerization, as is known in the art, these agents effecting crosslinking of the polymer at elevated or room temperatures. Typical examples of such crosslinking agents are formaldehyde and compounds which give off or react like formaldehyde, also free, partially or completely masked polyisocyanates, and carbodiimides.

Filler and pigments, for example, talc, silica, calcium carbonate, titanium dioxide, and cadmium yellow; plasticizers, for example, dioctyl phthalate, tributyl phosphate, and dioctyl maleate; sols of carbon black and of silicic acid, and dispersions of aluminum clay and of asbestos may be incorporated in the aqueous or aqueous-organic solvent polyurethane dispersions of this invention, if desired. These fillers, pigments, plasticizers, as well as crosslinking agents and other optional additives may be added to the polyurethane during polymerization, or alternatively may be added to the polyurethane polymer on mixing rolls. Ordinarily, the proportion of these optional ingredients in the polyurethanes will be in conventional proportions and will not amount to more than about 50%, by weight, of the polyurethane solids, and preferably will be less than about 10%, by weight.

The fact that the polyurethane polymer exists as discrete particles in the latices of this invention permits their being formulated with dispersions of dissimilar polyurethanes and dispersions of entirely different polymers that would not be compatible in solution. The latices of the invention thus open many new possibilities of polyurethane polymer applications. With the use of these latices, it is possible to produce dip-molded articles, or foam plastics by the latex churning process or by addition of coagulants to the aqueous dispersions to produce coagulates which can be worked up on mixing rollers similar to the manner of utilizing solvent free polyurethane polymers. By evaporating the solvent and water, it is possible to obtain sticky or non-sticky films, and crystalline powders.

The following examples will further illustrate this invention. The details given in the specific examples are given by way of illustration and not by way of limiting the invention thereof.

EXAMPLE I

A reaction vessel is set up equipped with a thermometer, gas inlet tube, agitation, and a condenser. The following are introduced into the vessel:
1. Polypropylene glycol 1000 M.W. — 199.7 gm
2. Polyethylene glycol 6000 M.W. — 27.0 gm
3. Dry acetone — 120.1 gm the vessel is heated to 60° C. and when the solid polyethylene glycol has dissolved in the polypropylene glycol, the following two ingredients are added:
4. Dibutyl tin dilaurate — 0.2 gm
5. Methylene bis-phenyl diisocyanate — 53.6 gm The reaction is heated at 60° C. (reflux) for 4 hours after which time the viscosity of the solution is about 84,000 cps. At this point, addition is made of:
6. Ethyl alcohol — 0.7 gm
7. Acetone — 160.1 gm After the previous materials have been allowed to mix in, the following is added:
8. Water — 420.4 gm over a period of 1.0 hour while the reaction is maintained at reflux (approximately 60° C.). After the water addition is completed, a distillation condenser is set up and the acetone solvent is distilled off at atmospheric pressure. After a period of about 3 hours, the temperature of the reaction will be about 94° C., and no odor of acetone will be detected in the reaction indicating that all the acetone has been removed. The reaction is then cooled to room temperature. The polyurethane dispersion obtained can readily be diluted with water.

EXAMPLE II

The procedure given in Example I is carried out using the following:
1. Polypropylene glycol 2000 M.W. — 31.1 gm
2. Polypropylene glycol 1000 M.W. — 189.8 gm
3. Polyethylene glycol 6000 M.W. — 4.4 gm
4. Methylene bis phenyl diisocyanate — 51.5 gm
5. Dibutyl tin dilaurate — 0.1 gm
6. Dry acetone — 126.1 gm
7. Ethyl alcohol — 5.0 gm
8. Acetone — 315.3 gm
9. Water — 458.6 gm Prior to the addition of the water, the following was added:
10. Aerosol TR-70 (Bis-tridecyl sodio sulfo succinate) — sodio 12.3 gm
11. Igepal CO-990 (Hydroxyethylated nonylphenol) — 8.9 gm The resultant aqueous dispersion could readily be mixed with aqueous dispersions of polystyrene, polyacrylic, and other polymers.

EXAMPLE III

The procedure given in Example II is carried out using the following:
1. Polyester diol of diethylene glycol adipic acid 2000 M.W. — 386.6 gm
2. Polyethylene glycol 6000 M.W. — 14.7 gm
3. Methylene bis paracyclohexyl diisocyanate — 56.9 gm
4. Dibutyl tin dilaurate — 0.1 gm
5. Dry acetone — 188.4 gm
6. Ethyl alcohol — 5.0 gm
7. Acetone — 471.2 gm
8. Aerosol TR-70 — 5.3 gm
9. Igepal CO-990 — 3.7 gm
10. Water — 548.4 gm The resultant polyurethane latex had a particle size of 0.17 microns and a nonvolatile content of 47.1%.

EXAMPLE IV

The procedure given in Example I is substantially repeated using the following:
1. 1,4-butane diol adipate 2000 M.W. — 160.5 gm
2. 1,4-butane diol — 4.5 gm
3. Polyethylene glycol 6000 M.W. — 6.7 gm
4. Methylene bis paracyclohexyl diisocyanate — 35.0 gm
5. Dry acetone — 91.3 gm
6. Ethyl alcohol — 5.0 gm
7. Acetone — 228.1 gm
8. Resimene X-714 (Melamine formaldehyde resin) — 6.5 gm
9. Aerosol TR-70 — 3.1 gm
10. Igepal CO-990 — 2.1 gm
11. Water — 260.2 gm
12. Triethylamine — 0.2 gm The triethylamine was post added to the latex. The polyurethane latex obtained had an intrinsic viscosity in tetrahydrofurane of 0.51 and a non-volatile content of 45.6%.

EXAMPLE V

The procedure of Example II was repeated using the following:
1. 1,6-Hexane diol/adipate-isophthalate 2000 M.W. — 200.0 gm
2. Polyethylene glycol 4000 M.W. — 8.0 gm
3. Methylene bis paracyclohexyl diisocyanate — 56.5 gm
4. Dibutyl tin dilaurate — 0.05 gm
5. Dry tetrahydrofurane — 113.4 gm
6. Ethyl alcohol — 2.5 gm
7. acetone — 281.0 gm
8. Aerosol TR-70 — 3.8 gm
9. Igepal C0-990 — 2.6 gm
10. Water — 269.8 gm The resultant polyurethane dispersion, when dried, yielded a tough, rubbery material.

EXAMPLE VI

The procedure of Example I was repeated using the following:
1. 1,6-Hexane diol/adipate-isophthalate 2000 M.W. — 200.0 gm
2. Polyethylene glycol 1000 M.W. — 10.0 gm
3. Methylene bis paracyclohexyl diisocyanate — 56.7 gm
4. Stannous octoate — 0.05 gm
5. Acetone — 400.2 gm
6. Ethyl alcohol — 2.5 gm
7. Aerosol TR-70 — 3.8 gm
9. Water — 272.2 gm The resultant polyurethane latex was blended with a polyethylacrylate latex (in equal parts). On drying of the mixture thereafter to remove the water, cohesive, rubber-like material was obtained.

Summarizing, it is seen that this invention provides a process for the preparation of stable polyurethane latices by means of incorporating specified amounts of polyethylene glycol into the backbone of polyurethane polymers. Various modifications of this invention will be apparent to those skilled in the art and it is to be understood that the invention is not to be limited to that set forth above for illustrative purposes.

We claim:
1. A process for preparing a predominantly linear polyurethane latex comprising the steps:
   a. reacting by initially heating an organic polyisocyanate and an organic compound containing at least two reactive hydrogen atoms as determined by the Zerewitinoff method and having a molecular weight of from about 300 to about 20,000, a portion of which is a polyethylene glycol of molecular weight from 600 to 20,000 in proportions such that the ratio of isocyanate groups to reactive hydrogen atoms is in the range of from 0.7 to 1.3, and said polyethylene glycol is present in an amount of from 2 to 12% by weight of polymer solids,
   b. terminating the polymerization reaction by addition of a terminating agent thereto when a desired viscosity is reached and thereafter,
   c. adding water to the reaction mixture in an amount so as to produce a latex containing from about 20 to 60% solids, by weight.

2. The process of claim 1 wherein the organic compound containing at least two reactive hydrogen atoms is selected from the group consisting of polyester diol, polyacetal diol, polyamide diol, polyester polyamide diol, poly(alkylene ether) diol and polythioether diol; and the polyethylene glycol is characterized by a molecular weight of from 4,000 to 6,000.

3. The process of claim 1 wherein the reaction of step (a) is carried out at temperatures of from 20° to about 150° C. for periods of from about 2 to 6 hours, and in step (b) the viscosity at the termination of the reaction being within the range of 20,000 to 140,000 cps.

4. The process of claim 2 wherein an emulsifying agent is added to the reaction mixture subsequent to step (b) and prior to step (c).

5. The process of claim 1 wherein step (a) is carried out employing an inert organic solvent.

6. The process of claim 5 wherein the organic solvent is stripped from the latex subsequent to step (c).

7. The process of claim 1 wherein the organic polyisocyanate is selected from the group consisting of aromatic diisocyanates, aliphatic diisocyanates and mixtures thereof.

8. The process of claim 1 wherein a cross-linking agent for polyurethanes is added to the reaction mixture of step (a).

9. A self-emulsifiable polyurethane composition prepared in accordance with claim 1 and an inert organic solvent.

* * * * *